United States Patent [19]

Brotz

[11] Patent Number: 4,666,766

[45] Date of Patent: May 19, 1987

[54] METALLIC FOAMED STRUCTURE AND MEANS FOR PRODUCING SAME

[76] Inventor: Gregory R. Brotz, 218 Pioneer Rd., Sheboygan, Wis. 53081

[21] Appl. No.: 668,977

[22] Filed: Nov. 7, 1984

[51] Int. Cl.⁴ .................. B32B 5/16; B32B 5/18; B32B 15/16; C01B 31/00
[52] U.S. Cl. ...................... 428/304.4; 264/29.1; 264/29.3; 427/217; 427/227; 427/404; 428/313.3; 428/319.1; 428/403
[58] Field of Search ............ 427/217, 222, 227, 244, 427/404; 428/304.4, 402, 403, 406, 407, 313.5, 317.9, 313.3, 319.1; 264/29.1, 29.3, 29.7, 109, 129

[56] References Cited

U.S. PATENT DOCUMENTS

| | | | |
|---|---|---|---|
| 3,042,970 | 7/1962 | Terenzi | 264/11 |
| 3,651,182 | 3/1972 | Rosenthal | 264/8 |
| 3,810,963 | 5/1974 | Benton et al. | 264/29.1 |
| 4,024,226 | 5/1977 | Lersmacher et al. | 264/29.1 |
| 4,039,297 | 8/1977 | Takenaka | 428/403 |
| 4,093,771 | 6/1978 | Fletcher | 428/406 |
| 4,496,627 | 1/1985 | Azuma et al. | 427/222 |

Primary Examiner—William J. Van Balen
Attorney, Agent, or Firm—William Nitkin

[57] ABSTRACT

A structure of bead-like material held together by a medium molded into a desired shape with interstices formed between the beads forming a useful structure which can be metallic-coated and method for producing same.

4 Claims, 11 Drawing Figures

METALLIC FOAMED STRUCTURE AND MEANS FOR PRODUCING SAME

BACKGROUND OF THE INVENTION

1. Field of the Invention

The apparatus of this invention is in the area of metallic foamed structures and more particularly relates to such structures and to apparatuses for the production of metallic foamed structures, some of which may incorporate carbon beads in their formulation. This application is copending with my application for a Carbon Bead Production Apparatus and Method.

2. Description of the Prior Art

Cellular metals are known in the prior art as well as devices for the production of beads Some devices to produce beads cause molten material with which to form the beads to pass downwardly through a cooling bath. Other devices cause such molten material to be formed into the beads while floating upwards within a cooling bath. Patents showing some of these various processes are:

U.S. Pat. No. 271,080, Kells
U.S. Pat. No. 2,973,783, Boe
U.S. Pat. No. 3,042,970, Terenzi
U.S. Pat. No. 3,207,588, Slayter
U.S. Pat. No. 3,508,871, Cory
U.S. Pat. No. 3,567,807, Shannon
U.S. Pat. No. 3,651,182, Rosenthal
U.S. Pat. No. 3,810,963, Benton et al
U.S. Pat. No. 4,035,116, O'Brien et al
U.S. Pat. No. 4,303,603, Torobin.

SUMMARY OF THE INVENTION

It is an object of this invention to produce a strong lightweight metallic foamed composite structure useful as structural material for a variety of purposes.

It is a further object to provide means for producing the metallic foamed material of this invention.

In one embodiment the metallic foamed structural material of this invention can incorporate carbon beads in its composition and it is an object of this invention to provide new apparatuses and methods for the production of such beads and the formation of metallic-coated, foam-like structures. In its simplest form the process of this invention includes the introduction of, for example, an uncured phenolic resin, or equivalent, discontinuously into the base of a column of molten metal medium or equivalent. Because of the cohesive nature of the resin and its incompatibility with the molten metal due to their dissimilar densities, the resin will form a globule when first introduced into the molten metal column. The globule of resin, since it is of lower density than the density of the molten metal, rises upwards within the molten metal column and expands and foams due to action of water present in the resin with the heat in the column. As the globule further rises in the molten metal medium-containing column, the resin cures and ultimately the heat of the molten metal will carbonize the resin globule forming a carbonized foamed resin bead. The degree of carbonization will vary with the temperature of the molten metal and the globule's length of residence within the medium-containing column. Different types of resins can be used in this process as discussed below. Molten metal is just one medium in which such beads can be formed and a variety of different mediums and/or medium combinations can be utilized as also discussed below. The length of time of immersion of the beads within the column can be controlled, for example, by the height and angle of the column, whether it be substantially horizontal causing a slower rising of the beads for a longer immersion or more vertical causing a faster rising of the beads which resulting shorter period of immersion can be lengthened and controlled by the placement of retainer plates in such more vertical column. The beads carbonize as they rise to the surface of the molten material and can, in one embodiment, overflow onto a ramp to a recover area where an escapement can enter them into molds to be pressed into the metallic foamed structures. Other techniques such as the use of continuous belt molding machines can pick up the beads at the top of the column. The beads can carry some of the molten medium as a coating on their surface which acts as a binder for the foamed beads once the coating has cooled. Additives such as phosphates, halides or equivalents can be added to the foaming material of the beads to assist in the adhesion of the coating to the beads. Medium that drains back into the column forms interstices between the beads. The molded structure containing beads with spaces formed therebetween can be coated with a metal or equivalent for additional strength but yet still be extremely light in weight. The molded structures can be in a wide variety of shapes as determined by the shape and type of mold and can be joined together to form complex structures.

DESCRIPTION OF THE PREFERRED EMBODIMENT(S)

The apparatus of this invention can be used in the formation of metal-coated foam structures and requires initially the production of foamed beads. The range of materials that can be formed into beads is quite large and in general can include all heat-curable materials and even though some specific kinds of materials are disclosed herein, they are presented as examples and any suitable material can be utilized. Further, the molten medium can not only be a molten metal as discussed in the Summary, but also can encompass a wide range of molten mediums which can be used for the heating, globule expansion, curing and carbonization of such beads. For example, mediums such as molten glass, hot oils, molten salts and other equivalent materials having the characteristics of a molten medium to accomplish the foaming, curing and carbonization of such beads can be used.

Figure 1:
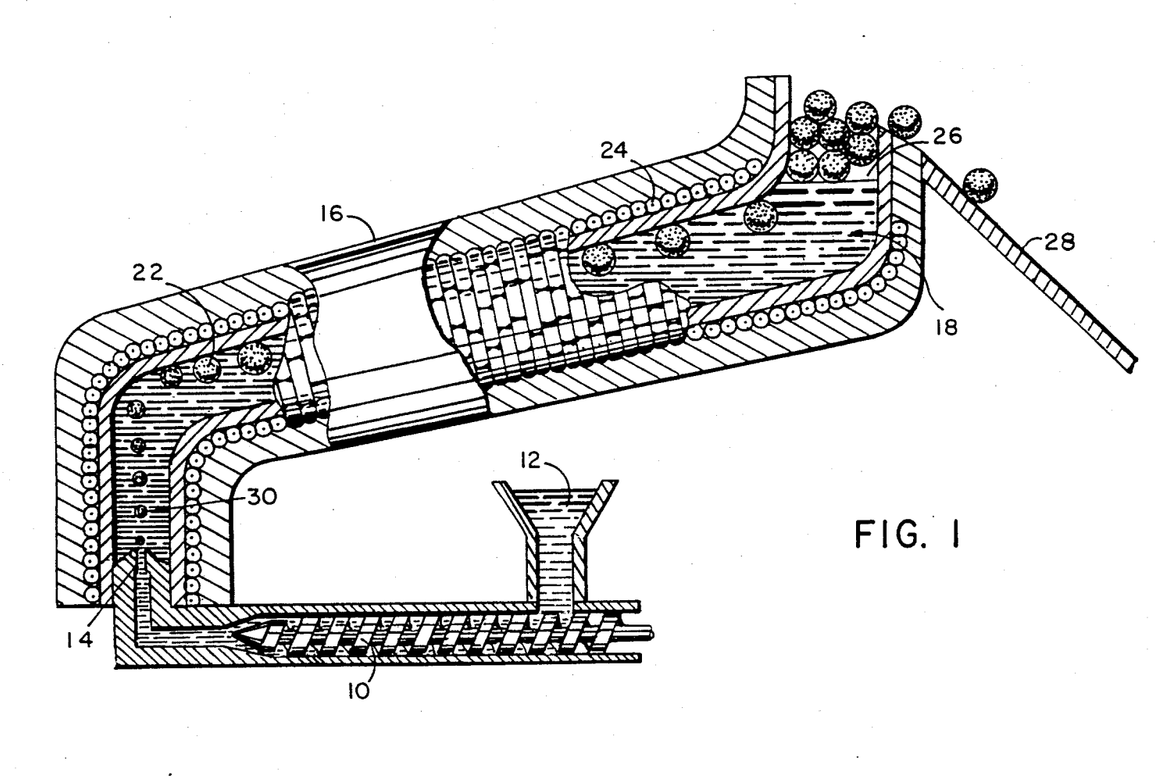
FIG. 1 is a partially cutaway cross-sectional view of a substantially horizontal molten medium-containing column with beads being formed therein.

FIG. 1 shows extruder 10 which can be of the screw type to drive molten resin 12 to nozzle 14 which introduces the resin continuously or discontinuously as desired by rotating until only a specific amount has been extruded and then stopping until that globule has separated from the nozzle and then starting rotation again to exude another globule into molten medium-containing column 16 which resin, as mentioned above, once introduced into molten medium material 18, because of the resin's internal cohesive energy and incompatibility with molten medium material 18, does not dissolve therein but forms globules 30 which, due to their lighter density compared to the density of molten medium material 18, rise within even a substantially horizontal column as shown. As seen, molten material 12 starts to expand and foam as it is heated due to water or commercial foaming agents such as Celogen or equivalent present in the resin and expanded globules 22 rise further within the column. The column is heated by a plurality of electric heating elements 24 although any equivalent suitable means to heat molten medium 18 can be utilized. Column 16 should be of sufficient length and heated to a sufficient temperature such that when expanded beads 22 reach the top of the column, they have carbonized and will float on surface 26 and be displaced upwards out of the medium by succeeding beads rising from below. Ramp 28 can be provided for the beads to slide off to a recovery area where they can be held.

Figure 2:
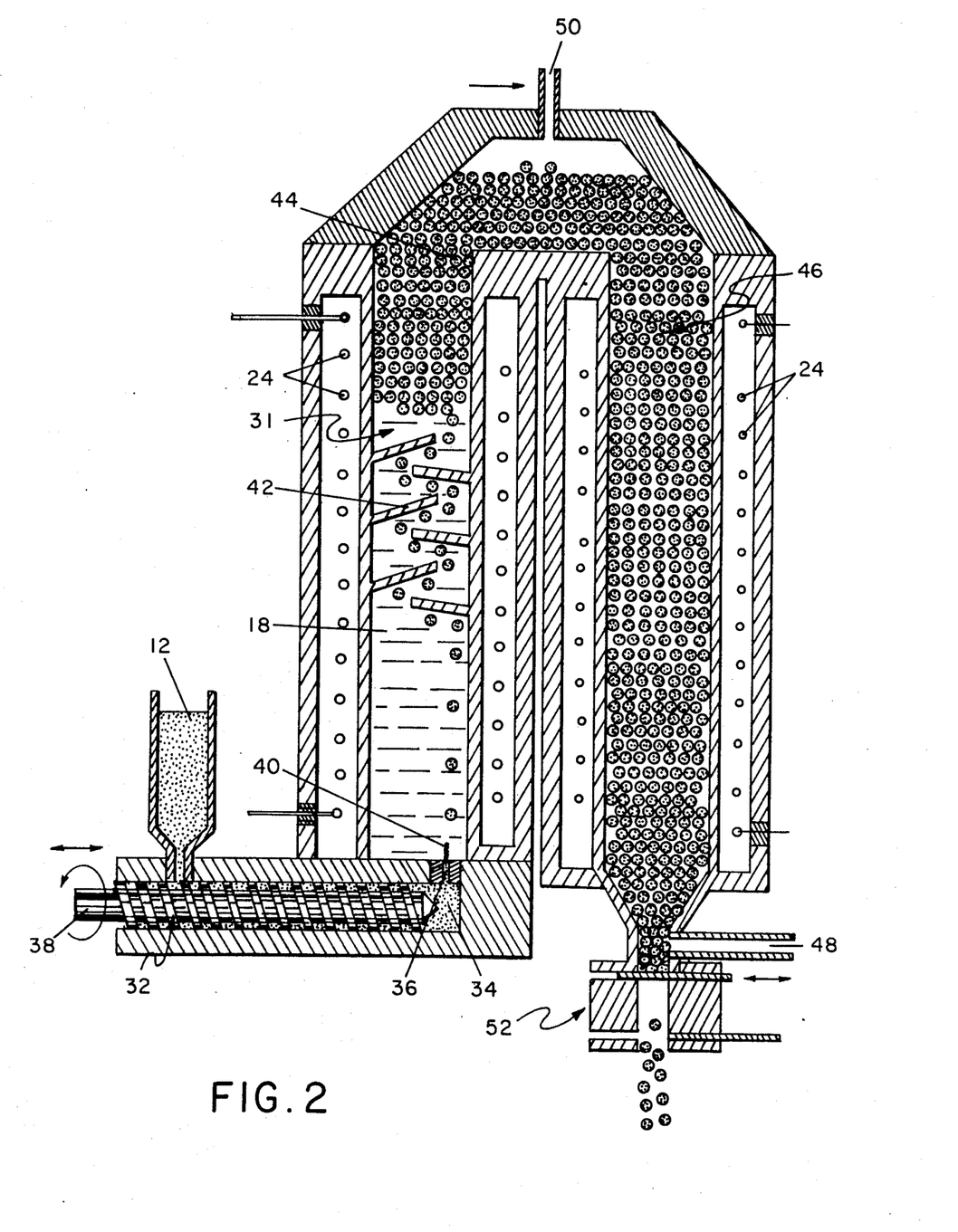
FIG. 2 illustrates a vertical medium-containing column with retainer plates to slow the rise of beads being formed within the molten medium.

FIG. 2 illustrates vertical column 31 having a similar type of screw-type extruder 32 as seen in FIG. 1 but which additionally moves back and forth as a piston as will be described in further detail below . Extruder 32 provides a particular volume of resin on each rotation to an area 34 beneath or connected to orifice 36 for the introduction of resin 12 into molten medium material 18, and the screw 38, then moves forward like a piston pressurizing area 34 and forces a predetermined amount of resin material 40 into molten bath medium 18. A plurality of retainer plates 42 can be positioned within the column which plates will force the beads to follow a circuitous path from under one plate to another thereby slowing their rise within vertical column 31 causing them to fully expand and carbonize before they reach the top of the column. The beads at the top of the column will be raised by the pressure of succeeding beads that rise beneath them within the column, and the beads on top will spill over top 44 of the column of molten medium to a second column 46 where they can be further heated and where gas 48 can be introduced at the base of the column to remove any waste products of carbonization. Such gas should be nitrogen or other inert gas or equivalent to exclude oxygen. Gas 48 exits second column 46 through vent 50 at the top of the column leaving the beads substantially clean. An escapement 52 can be provided below to receive and separate a predetermined amount of the beads to be introduced into a mold or into whatever other area they are going to be utilized.

Figure 3:
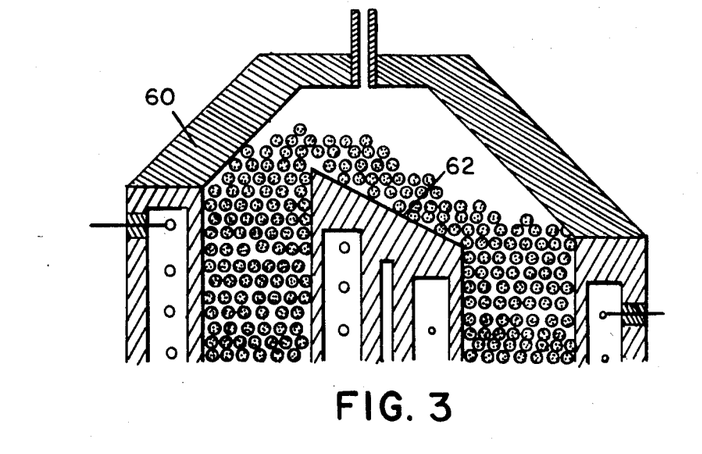
FIG. 3 illustrates a variety of top cap of the vertical column of FIG. 2.

FIG. 3 illustrates dome 60 having an angled ramp 62 at its top.

Figure 4:
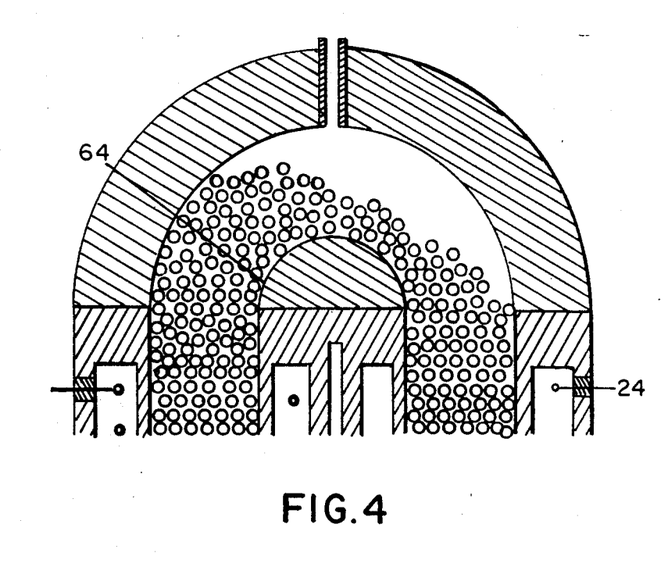
FIG. 4 illustrates another variety of top capof the vertical column of FIG. 2.

FIG. 4 illustrates a further version of a possible dome configuration where ramp 64 is rounded between the two columns which configuration allows for easy lifting and transfer of the beads to the other column where heater coils 24 can be provided therearound for further heating of the beads.

Figure 5:
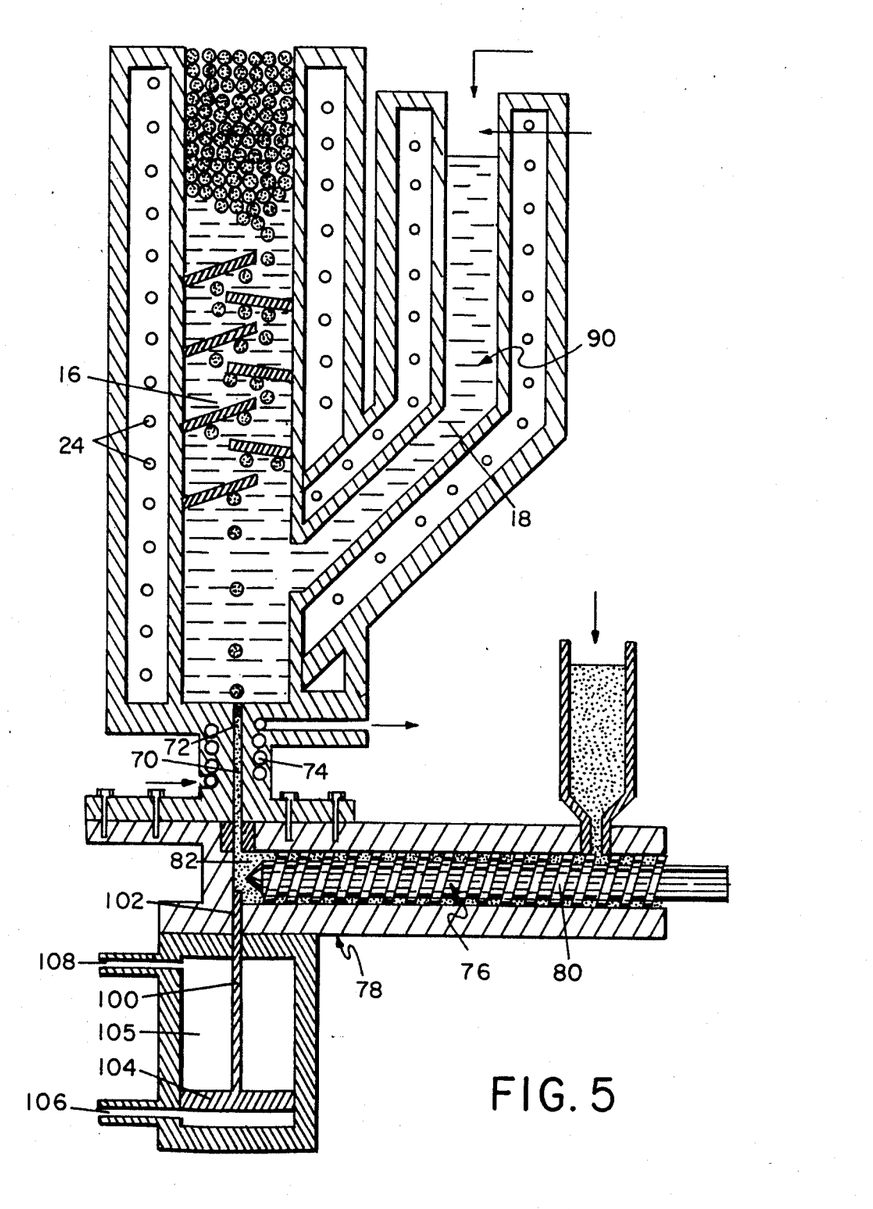
FIG. 5 illustrates an extruder/piston at the base of a column with a second material-adding column.
Figures 6, 7:
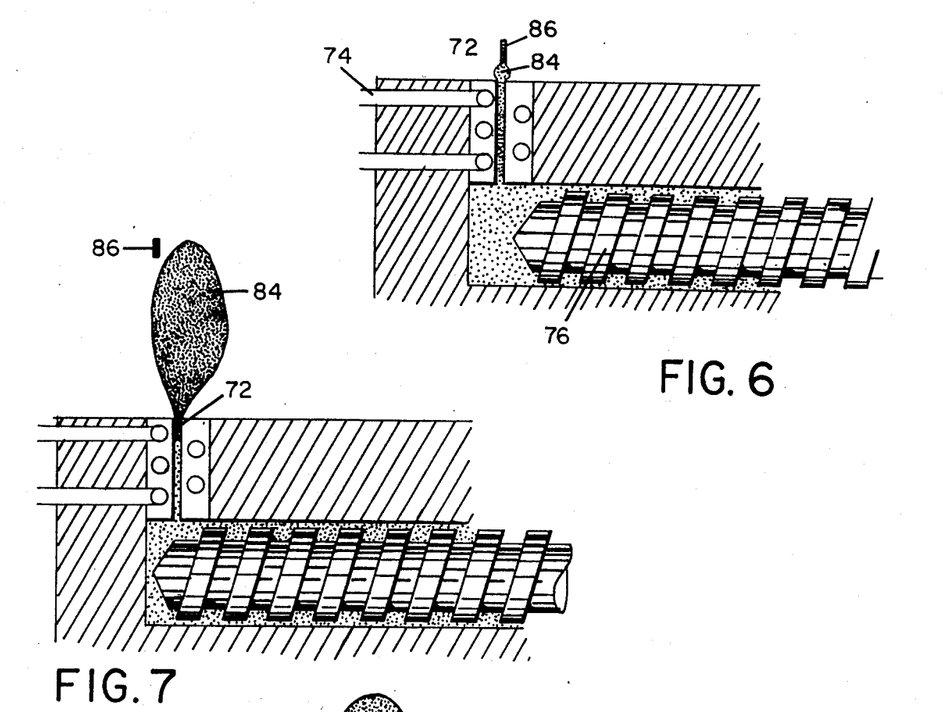
FIG. 6 illustrates an extruder in a rearward position.
FIG. 7 illustrates the extruder of FIG. 6 with the globule being formed.
Figure 8:
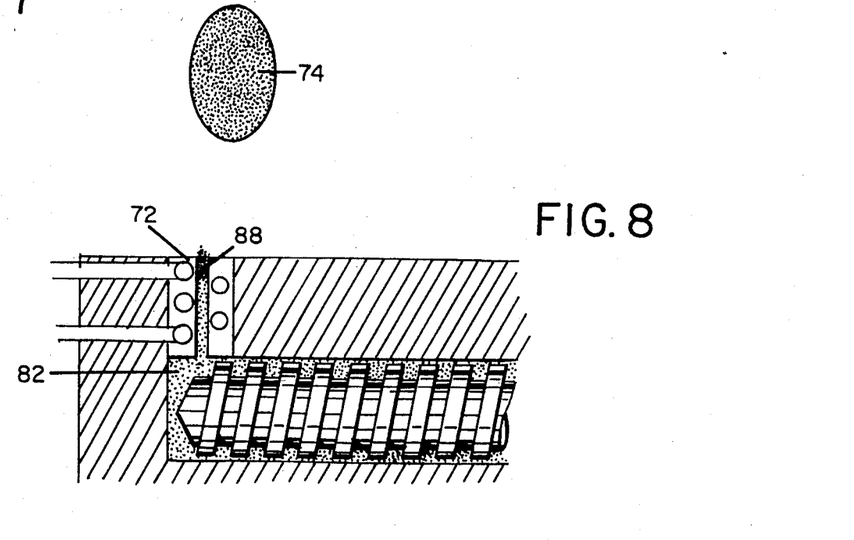
FIG. 8 illustrates a globule having been extruded and starting to rise.

In some embodiments it may not be necessary to utilize only molten resin to be introduced into the column of molten medium material. A solid resin can be used because in some resin/medium combinations the molten medium may initially melt the solid resin introduced therein to form a globule. Such a solid resin can be produced by grinding and blending together, for example, a solid resol and a solid novelac resin which can be fluxed together by programmed heating. A granular version of this type of resin can be pumped, as seen in FIG. 5, to nozzle 72 through a water-cooled straight or cone-type extruder nozzle 74 by a reciprocating screw-type extruder 76. The cooling of the nozzle is necessary to prevent the heat of the medium from foaming the resin before it has been extruded. This method works as described above, that is when screw 78 turns, it backs out of barrel 80 to pack solid resin material 70 in area 82 in the front of the barrel, and screw 78 is then moved forward as a piston by pressure thereon and pushes solid resin material 70 out of nozzle 72. Seen in FIG. 6 the reciprocating screw-type extruder 76 has started to force globule 84 of resin out of nozzle 72. Plug or cured skin 86 will be forced out of nozzle 72 as seen in FIG. 6 and will initially be on the top of the uncured globule but should separate therefrom during the processing as seen in FIG. 7. During the next stroke of the extruder, newly formed plug or cured skin 88 will pop out of nozzle 72 and will allow the uncured volume of resin in area 82 to be exuded into the molten medium where it will melt, coalesce and form into a bead. Spheres can also be produced by this process. The extruder utilizing the reciprocating screw can be of a very fast operation and the screw member can continue to turn even while it is moving back and forth forcing the material out through the exit nozzle. FIG. 8 illustrates globule 74 separated from nozzle 72 and rising upwards within the column which column is not seen in this view. FIG. 5 also illustrates an embodiment with an additional means of assisting the entry of granular resin into column 16. A pusher rod 100 is aligned through a rod aperture 102 in the base of extruder 78 aligned with nozzle 72 so that when pusher rod 100 rises, it forces solid resin material 70 ahead of it into nozzle 72 and the pusher rod itself can enter nozzle 72. This action of pusher rod 100 positively forces solid resin material 70 into nozzle 72 and then into column 16. The rod can be moved back and forth in synchronous action with extruder 76 by the action of an attached piston 104 in cylinder 105. First port 106 and second port 108 allow for hydraulic fluid to be alternately entered and removed in the front and rear of piston 104 in cylinder 105 to cause upward and downward movement of same which type of movement by a piston member is well known in the art.

FIG. 5 further illustrates column 16 with a medium-adding column 90 to add molten medium 18 which type of column is necessary if there is a loss of molten medium in the process as discussed below. Medium can also be added by using extruding systems forcing medium into the column.

Figure 9:
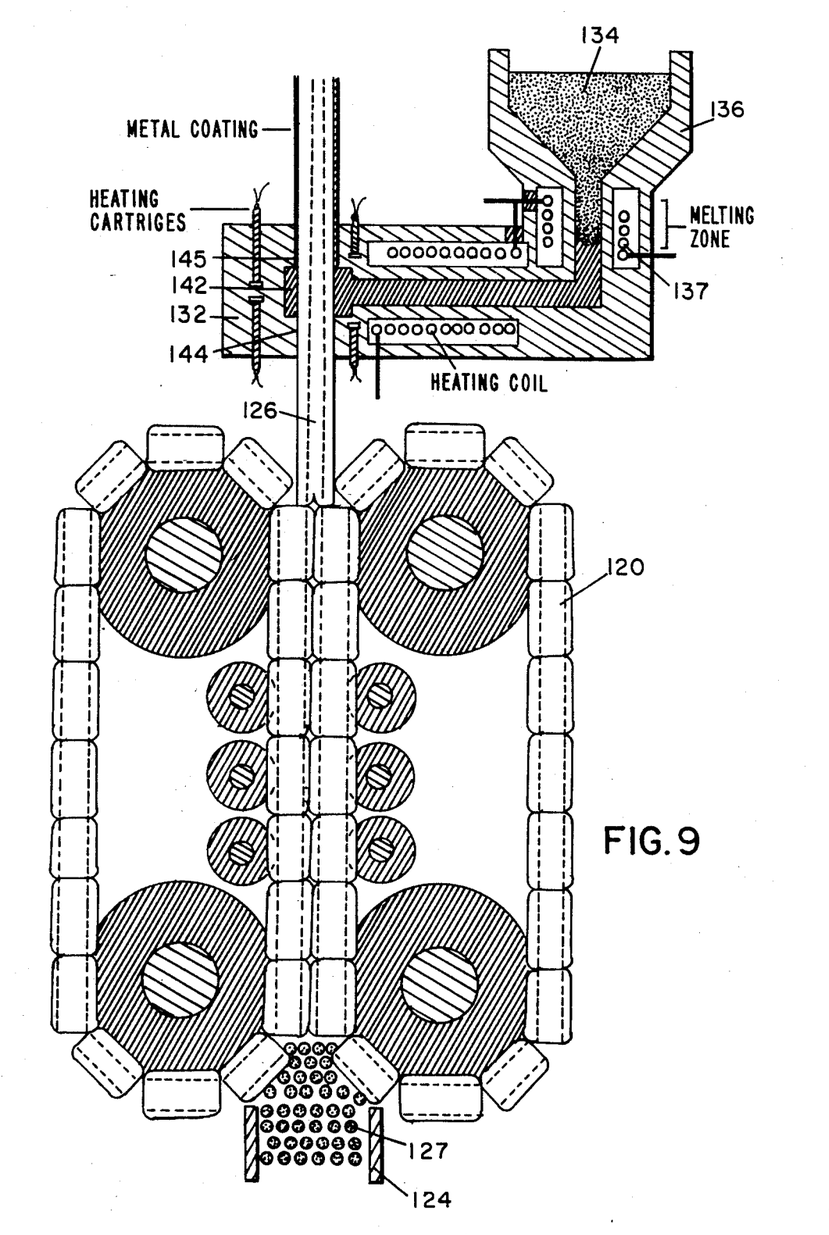
FIG. 9 illustrates a continuous molding belt with metal coater.
Figure 10:
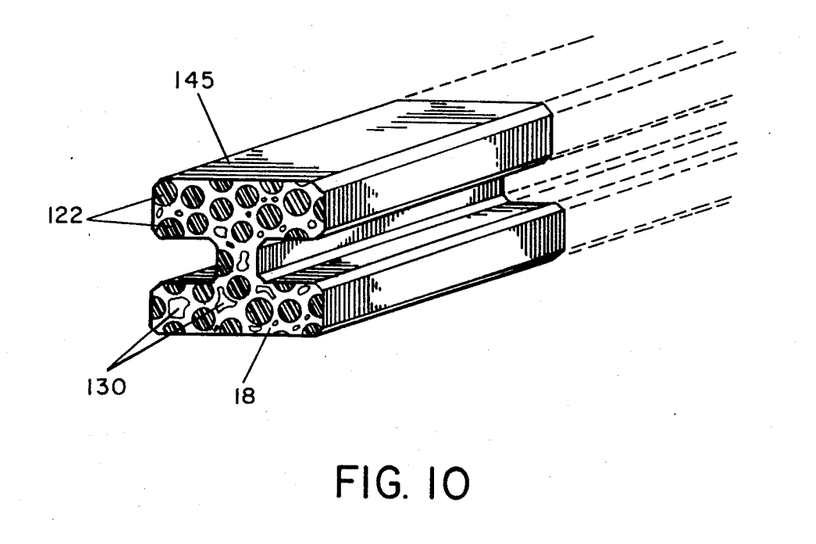
FIG. 10 illustrates a cross-section of a molded structure 1 beam showing beads formed into a structure and coated with a metal or equivalent.

FIG. 9 shows continuous belt molder 120 which, as it turns, picks up beads 122 from the top of medium-containing column 124 and forms them into a useful shape 126. Part of the molten medium can be carried on the outer surface of the beads to assist them in adhering to one another when pressed together in such belt-molding process. Most of the medium drains back into the column if it is of a type having a low viscosity. This drainage leaves many interstices and spaces 130 between the molded beads as seen in a metal-coated I-beam in FIG. 10. FIG. 9 further illustrates a process for coating the thus far formed foam-like structure with a metal or equivalent. The molded form 126 which in this case is a side view of an I-beam continues into casing 132 which contains a molten metal 134 in a melting chamber 136 which can be surrounded by heating coils 137. The molten metal passes through heated pipe 140 to chamber 142 where it surrounds structure 126. I-beam structure 126 enters chamber 142 through lower aperture 144 which conforms closely to the size and shape of structure 126 not allowing any molten metal 134 to drain out through aperture 144 due to the contact of the upwardly moving structure against the walls of aperture 144. Structure 126 then moves through chamber 142 and picks up a coating 145 of metal 134 which in one embodiment can be aluminum. Coated structure 126 then passes out of chamber 142 through exit aperture 146 which is larger than aperture 144 so the coating 145 will pass therethrough.

Figure 11:
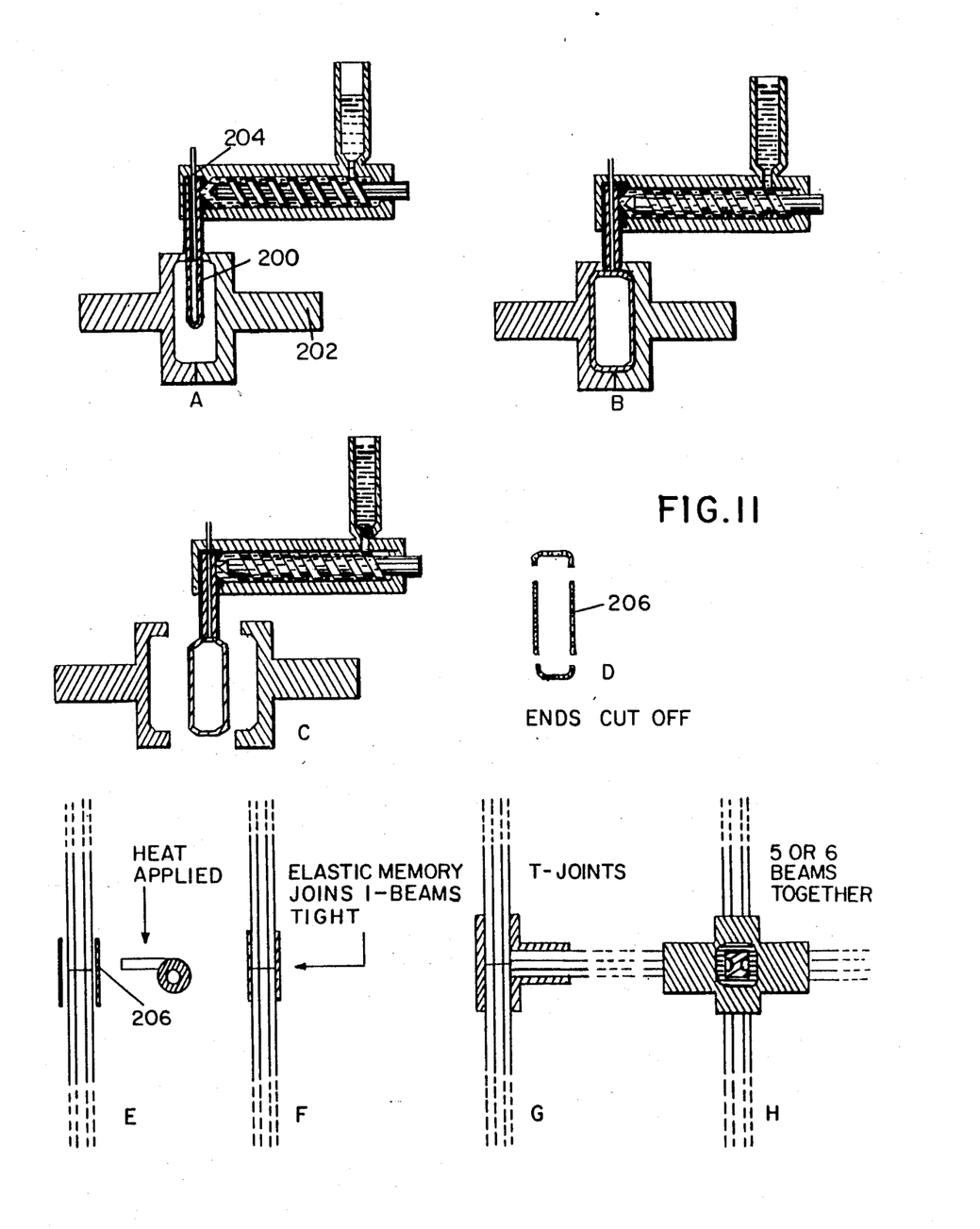
FIG. 11 illustrates methods of joining molded structures.

Coated structure 126 can be made into an infinite variety of objects where strong lightweight structural members are desirable. Individual structures of the metallic foamed material of this invention can be joined together such as seen in FIG. 11 by shrinking a collar member around the ends thereof. Such collars can be made by a blow molding of polyethylene terephethalate (PET) material as seen in FIG. 13a where shrink material 200 is entered into a separable mold 202 seen in cross-section and expands therein by air pressure through aperture 204 forming a collar 206 once the ends are cut off as seen in FIG. 11d. This collar 206 is slid around a junction of beams such as seen in FIG. 11e and heat is applied. Since the original structure of the collar was expanded, the omni-direction orientation of its molecules will cause it to shrink when heated and to take a more relaxed configuration as in a shrinkwrap. FIGS. 11g and 11h show multiple structures being joined by this method.

It should be noted that a variety of foam bead-forming materials and molten medium combinations can be utilized in the device of this invention. Phenolic resins in their liquid or solid states can be introduced into the molten medium which medium can be a molten metal including, but not limited to, aluminum, tin, iron, magnesium, and the like and in cases where the phenolic resin is in a solid form as discussed above, the extruder can be heated so that it could exude the resin into the molten material in a liquid form. This heating can be accomplished by using the same nozzle cooling system 74 as described above, but instead of putting cooling liquid through the system, hot liquid can be pumped therethrough. The column of molten material can contain mediums such as molten glass, hot oils or molten salts and such columns can be utilized with a combination of molten materials forming separate layers in a two-phase expansion medium such as a molten metal over a molten salt. Molten oils and molten salts are not suitable as binders but in a two-phase system such as the aforementioned example the salt can be used to treat the bead so that a good adhesion of the metal as a coating occurs as the beads pass through the molten metal. In the production of glass beads, for example, the melting temperature of the glass can be lower than the temperature of the molten metal but higher than the temperature of the upper level molten salt and the solidification of the bead will occur in the upper level phase. Another example, which is exemplary, is a polystyrene resin containing a certain content of moisture which is extruded into a hot glue or other molten polymer. The difference in densities between the two polymers will not be critical because as the foaming polymer blows, it will lose a great amount of density which occurrence will give it the buoyancy needed to rise within the column. If a medium such as, for example, hot oil is used that is lighter than the bead forming material, the beads will still rise for as they expand once introduced in the medium due to the heat, their density decreases and they become lighter than the medium and hence float upwards. Also, the use of phenolic foaming resin injected into a molten polyethylene terephethalate (PET) is a combination having very good properties versus the cost of materials. It is interesting to note that thermosetting foaming resin introduced into molten high-temperature polymers, once foamed and set, will not melt again.

Some resin with very high melting points have to be foamed in mediums having a lower melting temperature. In such cases the beads will foam due to the amorphous state of the material, for example, material having a moisture content. The gas pressure produced, for example, from the moisture in the bead material as it is heated is enough to blow the bead into a larger volume even though the bead formed might not be completely melted. Such foaming of resins which merely soften within such a molten polymer medium with melting temperatures in a similar range can also be suitable for the production of beads. Further the medium can be of a type that is stable if maintained at a temperature that is even above its melting point.

Another example of a foam bead medium coating is where the bead is a thermoplastic and the medium is a thermosetting resin. Care must be taken not to cure the medium. The use of a thermosetting resin medium may not pose too great a problem since the medium is used up as a coating and its residence time in the column can be relatively short. Some single stage self-curing phenolic resins can be held at their melting temperatures for long periods of time without curing. An example of a highly useful bead/medium combination is the use of a single-stage resin medium with a melting temperature at the boiling point of water and moisture-containing polystyrene beads which can be injected into the base of the column and pick up a coating of the resin. The coated beads can be molded into a shape which is then carbonized causing the beads to vaporize out of the structure leaving empty void spaces. The resulting structure can be then metal-plated if desired for strength, weather-protection and/or appearance.

Although the present invention has been described with reference to particular embodiments, it will be apparent to those skilled in the art that variations and modifications can be substituted therefor without departing from the principles and spirit of the invention.

I claim:

1. A method of forming a structure comprising the steps of:

introducing bead forming material into a column of molten medium of heavier density than the density of said bead-forming material;

forming globules of discrete amounts of said bead-forming material;

raising said globules in said column over a predetermined residence of time;

expanding said globules within said column as they rise therein;

foaming said globules within said column as they rise therein;

curing said globules within said column as they rise therein;

carbonizing said globules to form beads within said column as they rise therein;

coating said beads with said medium;

removing the thus formed coated carbonized foamed beads from said column;

entering said coated beads into a means for molding;

compressing said medium coated beads in said molding means;

draining excess from around said beads;

forming a plurality of interstices in the areas around said beads from where said medium has drained;

molding said beads coated with said medium into a shape;

solidifying said medium;

holding said beads together in said shape by said solidified medium; and coating said shape with a metallic substance.

2. The method of claim 1 further including the step of:

retarding the rise of bead-forming material by providing at least one retainer plate in said column.

3. The method of claim 1 further including the step of:

automatically adding additional molten medium to said column when the original molten medium becomes depleted below a desired level.

4. A structure produced by the method of claim 1.

* * * * *